INVENTORS
ALEXANDER F. H. ANDERSON
MELVIN CALVIN
BY

ATTORNEY.

United States Patent Office 3,258,467
Patented June 28, 1966

3,258,467
EXTRACTION AND PURIFICATION OF CHLOROPHYLL
Alexander F. H. Anderson and Melvin Calvin, Berkeley, Calif., assignors to the United States of America as represented by the United States Atomic Energy Commission
Filed Apr. 17, 1963, Ser. No. 273,797
6 Claims. (Cl. 260—314)

The invention disclosed herein was made in the course of, or under, Contract W-7405-ENG-48 with the United States Atomic Energy Commission.

The present invention relates to processes for separating complex organic chemical compounds, and more particularly to a process for extracting and purifying specific homologues of chlorophyll by chromatography.

Chlorophyll pigments are a necessary component of all plant life and are used by plants for storing the sun's energy and for catalyzing the basic reactions of the photosynthesis cycle. Chlorophyll is normally associated with several other pigments including xanthophylls, carotenes, and pheophytins. The exact function of the various pigments in the photosynthesis process is still somewhat obscure, but it is known that certain of the pigments are necessary for specific chemical reactions.

Unrefined chlorophyll is widely used in various commercial products such as dentifrices, deodorants and the like. However, the type of chlorophyll which has been used for these purposes is actually a crude mixture of several compounds that is obtained by solvent extraction of green plants. To separate and purify chlorophyll $a$ or $b$ from such associated pigments as xanthophyll and carotene has heretofore been difficult with the result that the purified product has been extremely costly. At present prices, purified chlorophyll $a$ may typically cost ten dollars per milligram.

Very pure chlorophyll pigments play an important role in controlled photosynthetic reactions. The exact role that each pigment plays in the process of photosynthesis is still subject to further investigation, but a great deal of information on this complex process is becoming available. In making such investigations, and in future processes which may be derived from such investigations, it is important to utilize the pure pigment in order to know the specific mechanics of a chemical reaction involved in photosynthesis.

The present invention is a much more economical method for purifying specific chlorophylls. Now it has been found that polyethylene powder, when used in a chromatographic column will yield an essentially complete separation of chlorophylls from xanthophyll and carotene. The chlorophyll fraction from the polyethylene column is eluted and subsequently separated into its components chlorophyll $a$ and chlorophyll $b$ by means of second chromatographing in a sucrose column. The chlorophyll $a$ and $b$ thus obtained is crystalline and of extremely high purity.

Accordingly, it is an object of this invention to provide a process for purifying homologues of chlorophyll.

It is still another object of this invention to facilitate the development of photochemical and photosynthetic reactions by providing for the economical production of large amounts of highly purified chlorophylls.

Another object of this invention is to provide a process for making a purified crystalline form of chlorophyll $a$.

A further object of this invention is to provide a rapid and simplified method of separating chlorophyll from a mixture of various associated pigments such as xanthophylls and carotenes.

It is another object of the invention to provide a more economical method for obtaining pure chlorophylls.

Other objects and advantages of the invention will be apparent from the following description considered together with the accompanying drawing of which:

A first principal type of chlorophyll compound of concern in this invention is chlorophyll $a$ which is a blue-green color and has the empirical formula:

$$C_{55}H_{72}MgN_4O_5$$

The other is chlorophyll $b$ which is an olive-green color and has the empirical formula: $C_{55}H_{70}MgN_4O_6$.  The presence of the smallest amount of impurity, such as xanthophyll, or carotene makes the chlorophyll a waxy substance. Previous separation methods usually left a small amount of xanthophyll which is very difficult to remove. However, no xanthophylls or carotenes contaminate the chlorophyll when prepared by this invention. The chlorophyll $a$ obtained by the present invention has such a purity that it readily forms crystals which have a distinctive X-ray pattern and a light absorption band at 740 millimicrons.

Previous methods of purifying chlorophyll $a$ and $b$ consisted of taking the acetone extracted pigments and transferring to a liquid hydrocarbon phase the chlorophyll and carotene pigments. Even with a careful technique, a small amount of xanthophyll goes into the hydrocarbon phase. The somewhat refined chlorophyll is then adsorbed on a talc material. After washing with liquid hydrocarbon, which removes most of the carotenes, the chlorophylls are desorbed with acetone. The process is very complicated, inefficient and wasteful. In comparison, the present invention recovers most of the chlorophyll and produces an essentially 100% pure crystalline product.

Figure 1:
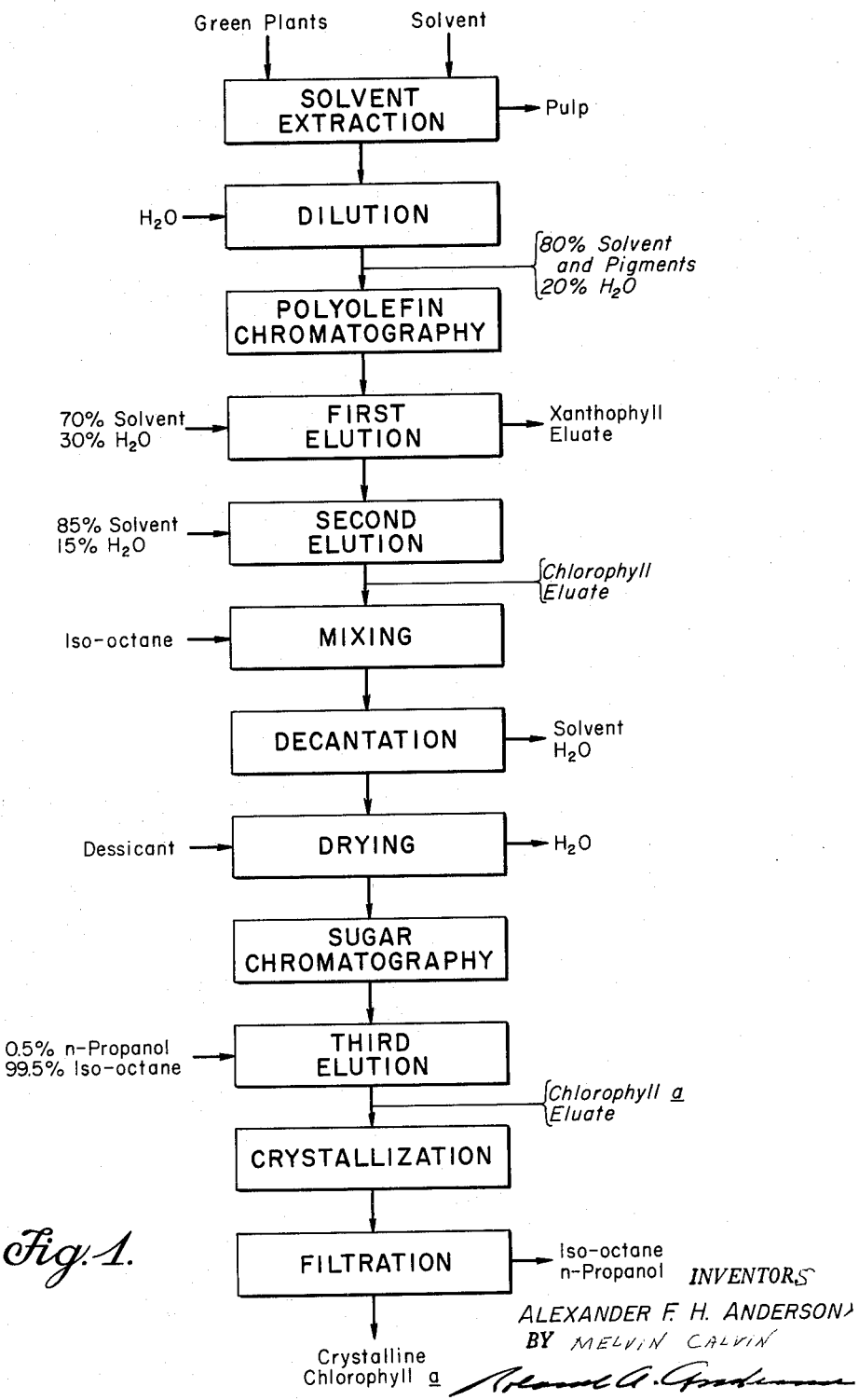
FIGURE 1 is a block flow diagram of a process exemplifying the invention.

In accordance with FIGURE 1 of the drawing, the present invention is practiced by initially extracting the colored pigments from any green plant in which the concentration of chlorophyll is sufficiently high. Solvents which are particularly suitable for extraction include acetone, propanal methanol and ethanol. Such plants include spinach, most green leaves, chard and algae. Of the above specified plants, spinach is a highly suitable source of material, as it is relatively inexpensive and has a high concentration of chlorophyll. Algae also contains chlorophyll $a$ and $b$, and in addition contains two newly identified chlorophyll compounds labelled as chlorophyll $c$ and chlorophyll $d$, which are not normally found in green plants. The solvent used in the aforementioned extraction step can be any ketone, or alcohol, but is preferably acetone.

Figure 2:
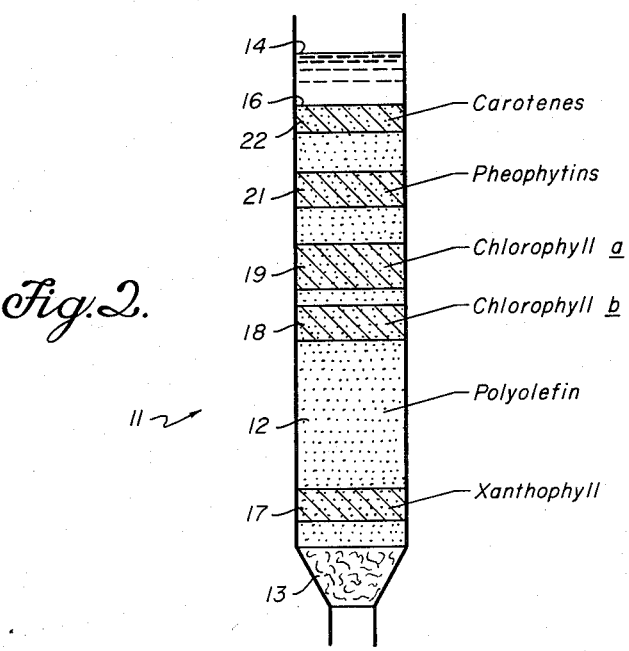
FIGURE 2 is a diagrammatic view of a polyolefin chromatograph column showing partitioned pigments at one stage of the process.

Referring now to FIGURE 2, there is shown a chromatograph column 11, in a vertical position, that is filled with polyethylene powder 12. The melt index (MI) of this powder is about two. This MI has been found to be the most efficient for the following extraction step. A glass wool plug 13 at the base of the column is used to prevent the polyethylene powder from being washed out of the column. The column is packed with several lots of dry polyethylene powder using a rammer to compress each addition. The column 11 is then washed with a 70% solution of acetone in water, and at the same time the liquid level 14 is maintained above the level 16 of the polyethylene powder. The pigments which are extracted in reagent grade acetone are introduced at the top of the column 11. A vacuum is applied to the base of the column and the pigments are drawn down the column and chromatographically partitioned into the bands as shown. Starting at the bottom of the column the first band 17 is xanthophyll, the second band 18 is chlorophyll $b$, the third band is chlorophyll $a$, the fourth band 21 is a mixture of pheophytins, and the top band 22 is a mixture of carotenes. After the column 11 is thus developed, the xanthophyll band 17 is eluated from the column 11 using a 70% acetone in water solution. Further elution of the column 11 with 85% acetone will bring down the chlorophyll $b$ band 18 and next the chlorophyll $a$ band 19. This mixture of chlorophyll $a$ and $b$ can be separated to a fairly good purity in another polyethylene column, having a low melt index of about 0.044. However, one of the unique features of the present invention is that by putting this mixture of chlorophyll into a sucrose column, a phase reversal will take place, i.e. the chlorophyll $a$ will be absorbed at the base of the column, and chlorophyll $b$ above it. This phase reversal gives a better separation.

Figure 3:
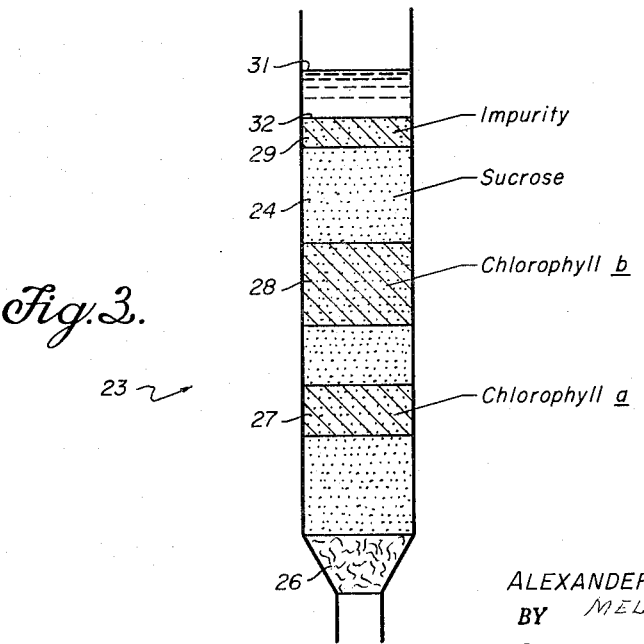
FIGURE 3 is a diagrammatic view of a sucrose chromatograph column showing partitioned pigments at a later stage of the process.

Considering the sugar chromatography step further and with reference to FIGURE 3, there is shown a standard chromatograph column 23 filled with sugar 24. The sugar 24 used for this type of application may be commercial powdered confectioners' sugar which can be used without further treatment. The sugar 24 is held in the column 23 by a cotton plug 26 in the base of the column. The chlorophyll eluted from the polyethylene column 11 as previously described, is next transferred to reagent grade iso-octane and agitated. The chlorophyll is more soluble in the iso-octane phase, and is separated from the acetone by decantation. The iso-octane is washed thoroughly with water to remove any traces of acetone, and is dried with a dessicant, such as $Na_2SO_4$ and is then introduced into the sugar chromatographic column 23 as shown in FIGURE 3. Prior to adding the iso-octane-chlorophyll solution, the column 23 is washed with pure iso-octane. The chlorophyll is then chromatographed into the bands as shown in FIGURE 3. Reading from the bottom of the column 23, the first band 27 is chlorophyll $a$, the second band 28 is chlorophyll $b$, and a small residual quantity of impurity 29 is adsorbed on the top of the column. This impurity 29 is eluted from the first polyethylene column 11 along with the chlorophyll fractions. As was the case in the operation of the polyethylene column 11, the sugar column 23 liquid level 31 should always be maintained above the top level 32 of the sugar. The chlorophyll $a$ 27 is next eluted with a 0.5% n-propanol in iso-octane solution, the small amount of n-propanol being necessary for satisfactorily performing the elution. Cooling of the eluate for several hours at about 30 degrees Fahrenheit will precipitate microcrystalline chlorophyll $a$, which can be collected by filtration or centrifugation. Further elution of the column 23, with the same solution, will bring down the chlorophyll $b$ 28, which can be precipitated out of solution by cooling for several hours, or by washing out the alcohol.

In the operation of the chromatograph columns containing the chlorophylls, it has been found best to prevent direct sunlight or any other light from falling on the columns. The concentrations of the solution used in the polyethylene column and the n-propanol-iso-octane solution used for elution in the sugar column may vary in composition. Also, it has been found that iso-propanol may be used in place of n-propanol in the elution step of the sugar column. Powdered polypropylene can be used in place of polyethylene.

For a further understanding of the invention, reference will now be made to an example of the production of purified crystalline chlorophyll $a$ which has been accomplished in accordance with the invention as hereinbefore described.

A 200 gram quantity of spinach was washed, shredded, and dried on blotting paper, then chlorophyllin pigments were extracted with 500 milliliters of absolute reagent grade acetone. The extractant was diluted with one part of water to four parts of extractant. The aqueous extract was applied to a glass column of 5 centimeters diameter which was dry packed with 1,000 ml. of powdered polyethylene (Dow, MI-2), which had been washed with 70% aqueous acetone. Following chromatographing, the order of the pigments from the bottom of the column was found to be xanthophylls, chlorophyll $b$, chlorophyll $a$, pheophytins and carotenes. After the pigments were adsorbed the column was developed with 70% aqueous acetone with the complete elution of xanthophylls. Subsequently, the chlorophylls were eluted with 85% aqueous acetone. To the acetone-water solution of the chlorophylls was added 200 milliliters of iso-octane in a separatory funnel and the acetone-water was decanted. More water was added to wash out all the acetone. The iso-octane solution was dried with anhydrous sodium sulphate and applied to a glass column, 5 centimeters in diameter, dry packed with 1,000 cc. of powdered confectioners' sugar which had been washed with 250 ml. of iso-octane. The column was developed with a solution of 0.5% n-propanol in iso-octane and the chlorophyll $a$ was eluted. The eluate was maintained at 30 degrees Fahrenheit for eight hours and microcrystalline chlorophyll $a$ separated out. The yield was 40 milligrams of chlorophyll $a$.

Thus, while the invention has been described with respect to particular embodiments thereof, it will be apparent to those skilled in the art that numerous variations and modifications are possible within the spirit and scope of the invention, and thus it is not intended to limit the invention except as defined in the following claims.

What is claimed is:

1. In a method of obtaining pure chlorophyll values from an unrefined extractant obtained by solvent extraction of green plants, the steps comprising, adsorbing the extractant on powdered polyolefin, said polyolefin being selected from the group consisting of polyethylene and polypropylene, chromatographically eluting xanthophyll from said polyolefin, further eluting said polyolefin to collect chlorophyll values, readsorbing said chlorophyll values on sucrose, and sequentially chromatographically eluting purified chlorophyll values from said surcose.

2. In a method of separating and purifying chlorophyll values from an extract mixture obtained by solvent extraction of green plants, the further steps comprising, chromatographically adsorbing said mixture in a column of powdered polyolefin, said polyolefin being selected from the group consisting of polyethylene and polypropylene, chromatographically eluting xanthophyll from said mixture on said polyolefin, further eluting said polyolefin to collect said chlorophyll values, readsorbing said values on a sucrose column, and selectively chromatographically eluting separate ones of said chlorophyll values from said sucrose.

3. A method as described in claim 2, wherein said xanthophyll elution of the polyolefin column is performed using a solution of acetone in water.

4. A method as described in claim 2, wherein the elution of said sucrose column is performed using a solution containing iso-octane.

5. In a process for separating and purifying specific chlorophyll values from a plant extract containing said values, the steps comprising adsorbing said extract on powdered polyethylene, chromatographically eluting said polyethylene to remove xanthophyll therefrom, further eluting said polyethylene to collect chlorophyll values, readsorbing said values on powdered sucrose, and chromatographically eluting specific chlorophyll values from said sucrose.

6. The process as claimed in claim 5 wherein the elution of the powdered polyethylene is performed by passing a solution of acetone in water therethrough.

References Cited by the Examiner

Anderson et al.: Nature, vol. 194 (Apr. 21, 1962), pages 285–6.

Glasser Medical Physics, Year Book Publishers, Inc., Chicago, Ill. (1944), pages 154–5.

WALTER A. MODANCE, *Primary Examiner.*

J. A. PATTEN, *Assistant Examiners.*